S. H. Wheeler,

Nut Lock.

No. 108,223.   Patented Oct. 11. 1870.

Witnesses
Henry Michael
Willman Blanchard

Inventor
Shephard H. Wheeler

United States Patent Office.

SHEPHERD H. WHEELER, OF DOWAGIAC, MICHIGAN.

Letters Patent No. 108,223, dated October 11, 1870.

IMPROVEMENT IN NUT-LOCKS.

The Schedule referred to in these Letters Patent and making part of the same.

I, SHEPHERD H. WHEELER, of Dowagiac, in the county of Cass and State of Michigan, have invented certain Improvements in Nut-Locks, of which the following is a specification.

My invention relates to the combination of a wedge with the male and female screw of a common nut and bolt, in such a manner that the said wedge supplies the place of a part of the thread of the female screw in the nut, and impinges against the bolt between the threads of the male screw on the bolt, the friction of which causes the wedge to impinge harder as the nut is being unscrewed, thus locking the nut firmly on the bolt, the object being to prevent the nut from becoming loose, or accidentally detached from the bolt to which it belongs.

To enable others to make and use my invention, I will proceed to describe its construction and operation, reference being had to the accompanying drawing making a part of this specification, in which—

Figure 1:
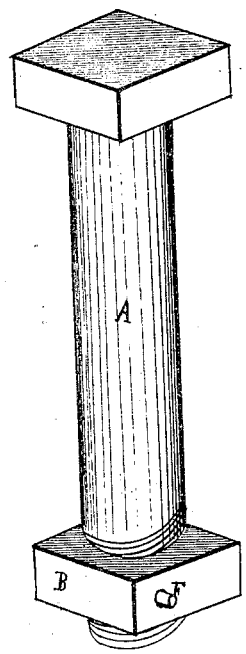
Figure 1 is a perspective view of a device embodying my invention.
Figure 2:
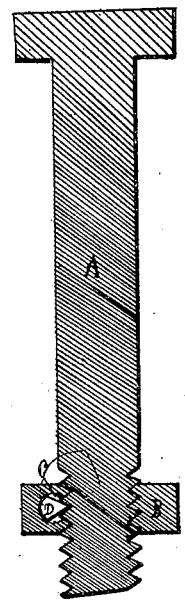
Figure 2 is a vertical transverse section, showing the wedge in this view to be in the form of a sector cut from a circle, whose greatest radius is equal to the diameter of the recess in the nut in which it works.
Figure 3:
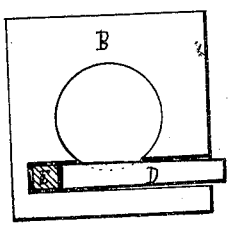
Figure 3 is an enlarged plan of the nut, showing the spring and a longitudinal view of the wedge.

A is a bolt, constructed in the usual manner, having a head on one end, and a screw-thread on the other.

B is a nut, having a female thread fitting the thread on the bolt A.

C is a recess, extending nearly through the nut, intersecting one side of the thread in the nut, displacing a part of one of these threads, which is replaced by the sharp corner of the sector-shaped wedge D.

This wedge is inserted in the recess, the large end of which rests against a spring, E, or some elastic substance in the bottom of the recess.

This spring causes the wedge to crowd slightly against the bolt, producing sufficient friction to draw the wedge tighter as the nut is turned in one direction, thus locking it, but will not prevent turning the nut in the opposite direction, as the spring will yield and allow the wedge to withdraw sufficiently to allow the nut to turn freely.

The small end of the wedge D projects out of the recess sufficiently to form a stem, F, by which the wedge may be pressed back, in which position the nut may be turned in any direction that may be desired.

Having thus fully described my invention,
What I claim is—

The combination of the wedge D, spring E, recess C, nut B, and bolt A, substantially as and for the purposes hereinbefore set forth.

SHEPHERD H. WHEELER.

Witnesses:
HENRY MICHAEL,
WELLMAN BLANCHARD.